United States Patent [19]
von Glehn

[11] Patent Number: 5,728,199
[45] Date of Patent: Mar. 17, 1998

[54] INSERT FOR AIR FLOW DUCTS

[75] Inventor: Andreas von Glehn, Vaxholm, Sweden

[73] Assignee: Freshman AB, Taby, Sweden

[21] Appl. No.: 750,456

[22] PCT Filed: Jun. 6, 1996

[86] PCT No.: PCT/SE95/00654

§ 371 Date: Dec. 6, 1996

§ 102(e) Date: Dec. 6, 1996

[87] PCT Pub. No.: WO95/33567

PCT Pub. Date: Dec. 14, 1995

[30] Foreign Application Priority Data

Jun. 7, 1994 [SE] Sweden ............... 9401950

[51] Int. Cl.$^6$ ............... B03C 3/30
[52] U.S. Cl. ............... 96/17; 55/276; 55/520; 361/226; 361/233
[58] Field of Search ............... 96/17, 32, 39, 96/40, 16, 97, 96; 95/76; 55/520, 276; 261/94, 112.1, DIG. 72; 210/487, 493.4, 494.1; 428/119, 178, 179; 361/226, 233

[56] References Cited

U.S. PATENT DOCUMENTS

| | | | |
|---|---|---|---|
| 1,118,237 | 11/1914 | Saint Cyr | 55/520 X |
| 2,063,743 | 12/1936 | Kamrath | 55/520 X |
| 2,277,712 | 3/1942 | Otto | 96/97 X |
| 2,404,789 | 7/1946 | Burk et al. | 261/112.1 |
| 2,593,869 | 4/1952 | Fruth | 96/16 |
| 3,966,646 | 6/1976 | Noakes et al. | 55/520 X |
| 4,701,287 | 10/1987 | Manteufel | 261/112.1 X |
| 5,405,422 | 4/1995 | Ueda et al. | 55/520 X |

*Primary Examiner*—Richard L. Chiesa
*Attorney, Agent, or Firm*—Terrance L. Siemens

[57] ABSTRACT

An insert for air flow ducts includes a band (10) of a semi-stiff, although flexible character, a plurality of interspaced interflanges (11) along the band and spaced edge flanges (14) which are connected with the interflanges, the interflanges in pairs together with the band (10) and the edge flanges (14) delimiting consecutive cavities or pipes (12') along the band, the opposed ends of the cavities or pipes being open, the band being formed into a loop in which the band and the edge flanges are located tightly adjacent to each other and in which the pipes (12') are substantially evenly distributed.

7 Claims, 3 Drawing Sheets

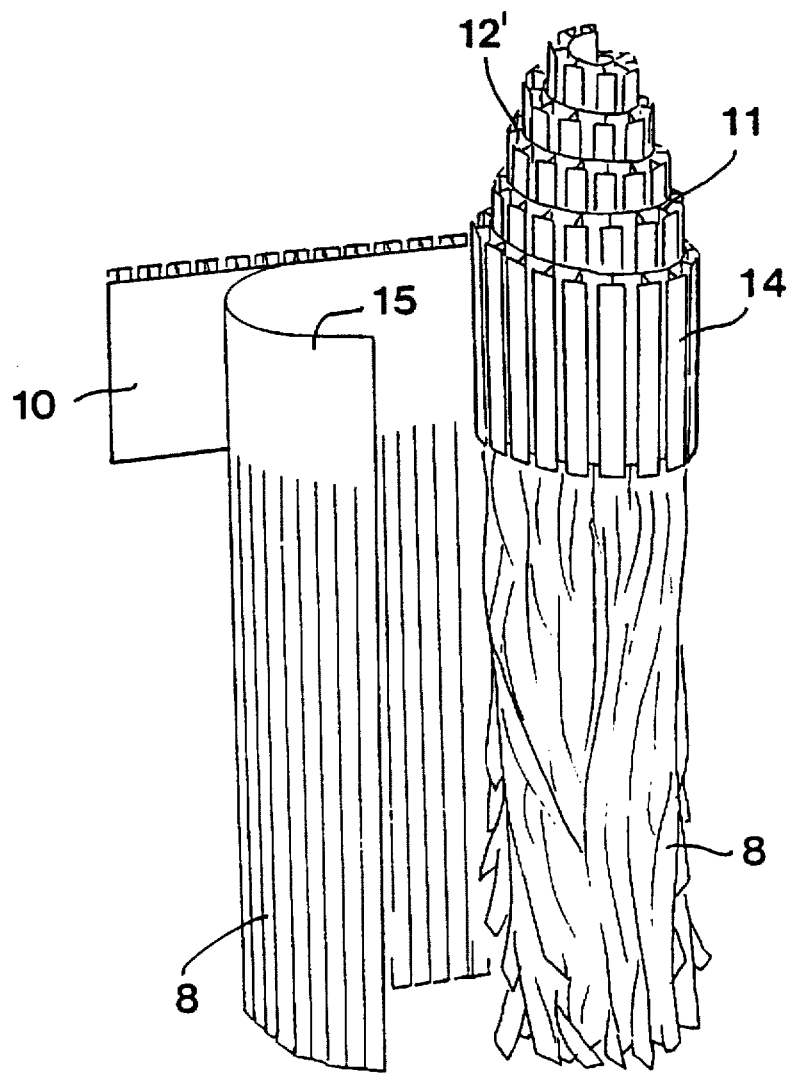
Fig G

INSERT FOR AIR FLOW DUCTS

BACKGROUND OF THE INVENTION

In the technical field of air purification, the need for a far-reaching and efficacious separation of not only such air-borne particles that are visible, but also of those extremely fine particles that have a microscopic or ultra-microscopic size, has lately increased markedly. In order to satisfy this need, a particle separating arrangement has been developed which makes use of a set of strips or threads of a polymer material, which are automatically set in motion relative to each other by an air stream passing through the duct, whereby they are rubbed against each other to generate static electricity. In this way, the strips are charged electrostatically, whereby they manage to effectively attract and trap also extremely fine particles carried by the air. These strips are held by a carrier or an insert which extends transversely across the air flow duct and intercepts it, a large amount of pipes or cavities being present in the insert which have the purpose of facilitating the passage of the air through the insert, at the same time as they bring about a substantially even distribution of the air before it comes into contact with the strips, whereby it is guaranteed that substantially all strips in the strip set will work in an efficient manner. However, till now the production of such strip-carrying inserts has been time-consuming and has almost had the character of craftsmanship; something that has caused high costs for the production of the particle separating arrangement in its entirety. Therefore, there exists a pronounced need for a strip-holding insert which may be produced in a simple and inexpensive way.

Further in the field of air purification, there is a need for introducing a simple and cheap insert being capable of silencing sound, into air flow ducts of different sorts. Thus, not seldom annoying sounds arise from the fan that is mounted in or adjacent to the duct and has the purpose of setting the air in motion through the duct. For instance, a smaller electrically drivable fan is mounted in such particle separating arrangements which have the shape of a housing being placeable or mountable in a room, said housing having an inlet and an outlet for the air which fan not seldom causes comparatively high sound levels in the surrounding room where the air flow duct from the fan to some of said in- and outlets is open or non-insulated.

OBJECTS AND FEATURES OF THE INVENTION

The present invention aims at meeting the above-mentioned requirements. Thus, a primary object of the invention is to provide an insert which on one hand works silencing when mounted in an air flow duct and on the other hand may be easily connected to a set of strips or threads of an electrostatically chargeable nature, at the same time as the insert shall be constructively simple in order to be quickly and effectively manufactured and at a low cost. According to the invention, this object is accomplished by the features as defined in the discussed hereinafter.

Advantageous embodiments of the insert according to the invention are further defined in the dependent claims.

BRIEF DESCRIPTION OF THE APPENDED DRAWINGS

In the drawings:

FIG. 1 is a vertical longitudinal section of a particle separating arrangement which makes use of two different embodiments of an insert according to the invention, FIG. 2 is a perspective view showing a prior art starting workpiece of which the insert according to the invention is made, FIG. 3 is a similar perspective view showing the same workpiece after shaping, FIG. 4 is a planar view of the workpiece according to FIG. 3 during initiated winding into a spiral-shaped loop, FIG. 5 is a planar view showing the finished spiral loop, and FIG. 6 is a perspective view showing a screw-shaped embodiment of the insert which is preferred for silencing purposes.

DETAILED DESCRIPTION OF PREFERRED EMBODIMENTS OF THE INVENTION

Figure 1:
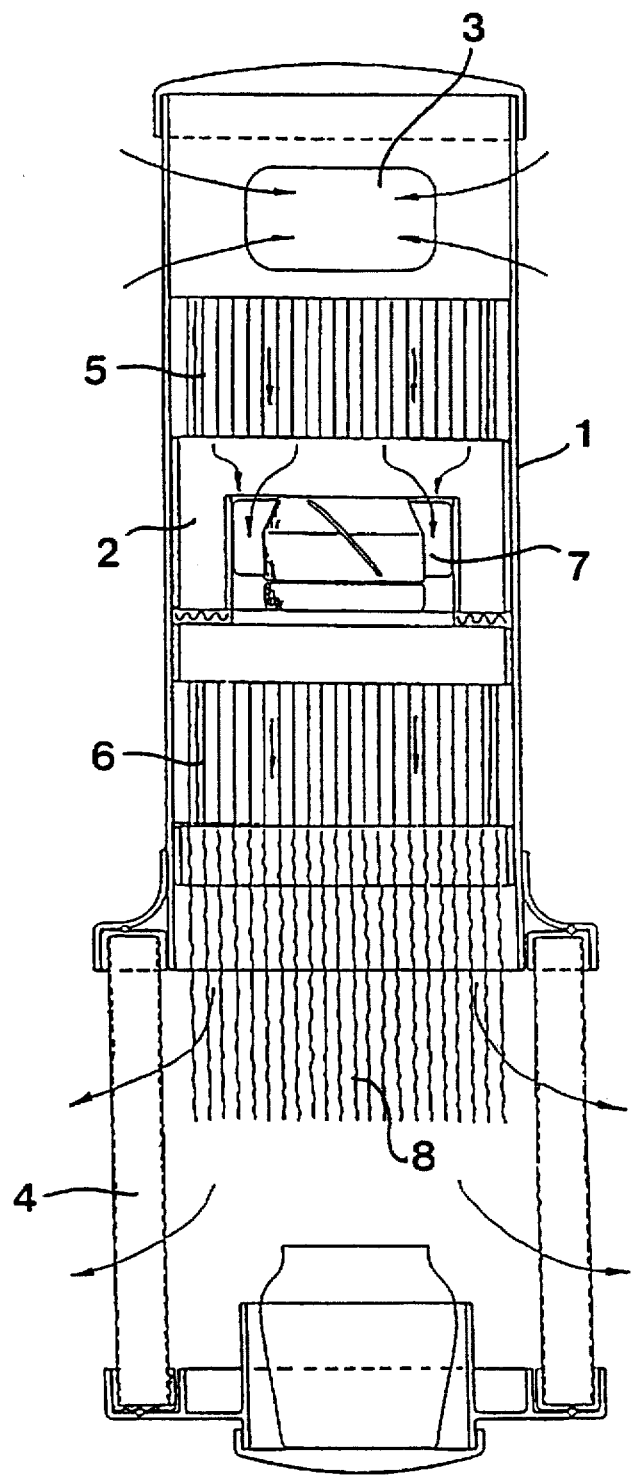

In FIG. 1, reference numeral 1 generally designates a substantially tube-shaped housing whose internal cavity 2 forms an air flow duct between an inlet 3 and an outlet 4, said duct having the shape of a cylindrical filter tube through which air may pass radially in a direction from the inside and outwardly. Within the duct 2 two inserts 5, 6 are mounted of which the former is mounted upstream of a fan 7, while the latter is mounted downstream of the fan. As may be clearly seen in FIG. 1, the insert 6 carries a large number of strip- or thread-shaped elements 8 which in practice may be made of a polymer material, such as polypropylene, that is capable of producing static electricity when the strips are set in motion and are rubbed against each other by the influence of the air stream passing axially through the strip set.

Reference is now made to FIG. 2 to 6 which illustrate the procedure for producing either one of the inserts 5, 6.

Figure 2:
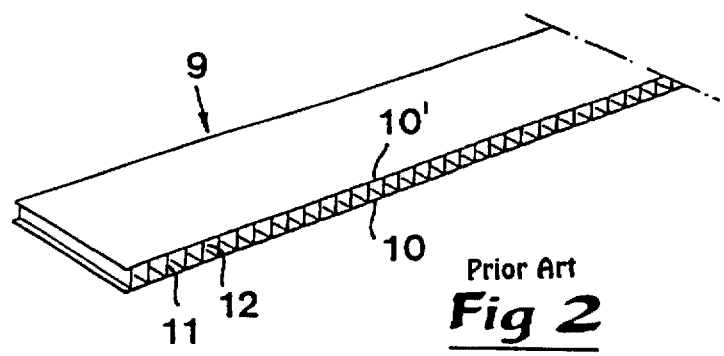
Figure 3:
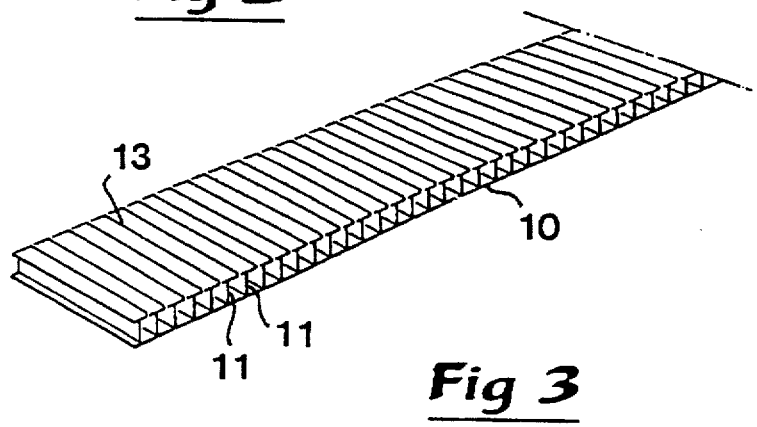

In FIG. 2 a starting workpiece 9 is shown that comprises two semi-stiff, although flexible bands 10, 10', which are held together and apart from each other by means of a plurality of interspaced interflanges 11. These interflanges 11 are made in one piece with the two bands 10, 10' in order to delimit by pairs and together with these bands, consecutive cavities or pipe 12 along the bands. In practice, the workpiece 9 being made in one piece advantageously consists of comparatively thin plastic with a certain inherent stiffness. In practice, the thickness of the bands 10, 10' as well as of the interflanges 11 may lie within the range of 0.2 to 0.8, suitably 0.4 to 0.6 mm. The internal distance between on one hand the bands 10, 10' and on the other hand the adjacent interflanges 11, can advantageously be within the range of 2 to 6, suitably 3 to 4 mm. Thus, the pipes or ducts 12, which are open at their opposed ends, have a square or rectangular cross-sectional shape with a surface within the range of 4 to 36 mm$^2$. Advantageously, the width of the bands 10, 10' may lie within the range of 20 to 70, suitably 20 to 50 mm, while their length varies depending upon the factual diameter of the air flow duct in question.

In practice, the workpiece 9 as shown in FIG. 2 is commercially available, albeit in units of a considerably larger length and width than shown in the figure.

In accordance with a characteristic feature of the invention, slots 13 (see FIG. 3) are provided in one of the two bands, in the present case in the band 10', between adjacent interflanges 11. Preferably, though not necessarily, such slots are provided between all pairs of adjacent interflanges, the individual slot suitably being located halfway between the flanges and extending parallel with them. In practice, the slots 13 can be made in different ways, e.g. by cutting with a suitable cutting tool. However, it is also feasible to form the slots already in connection with the basic production of the workpiece or the unit.

Figure 4:
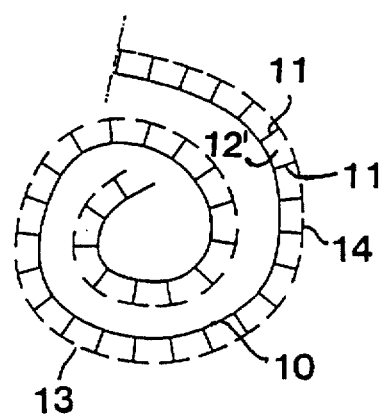
Figure 5:
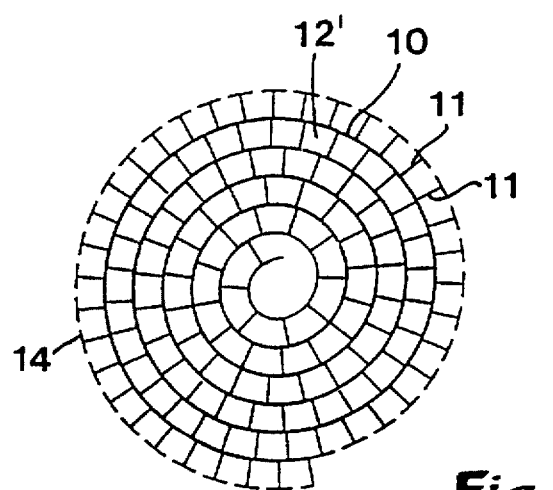

By the provision of the slots 13, the unit may be formed into a loop, preferably a spiral-shaped loop as seen in FIGS. 4-5, in that the loops allow a bending of the unit around the slot-free band part 10, said part serving as a joining element. When the band unit is formed into a spiral according to FIG. 5, the two bands 10, 10' will be located tightly to each other, whereby however the slotted band 10' has assumed the form of a plurality of edge flanges 14, which are interspaced in that the slots 13 widen in connection with the bending of the band into a spiral loop. In this connection, these railhead-like edge flanges 14 form a support or abutment for the inside of each externally located band part 10, as may be clearly seen in FIG. 5.

The body that is formed in accordance with FIG. 5 and that has a substantially cylindrical contour and external form can be made to maintain its shape in different ways. One way is to fasten the outer end of the band loop to the next internally located band loop in a suitable way, e.g. by gluing or welding. Another and preferred way is to glue the band part 10 to the edge flanges 14, for instance by coating the inner surface of band 10 with glue. In this state, the cylindrically formed body may be used as a silencing or sound insulating unit, e.g. in the form of detail 5 in FIG. 1.

As indicated in FIG. 6, the body shown in FIG. 5 may also be connected with a set of strips or threads, thus providing a strip-carrying insert 6 according to FIG. 1. In practice, the application of such strips on the body can be made in different ways. One way is to clip or cut a thin plastic foil 15 by cross-cuts which are terminated at a certain distance from a longitudinal edge along the foil, so that individual strips will be held together by an elongated foil edge part. This edge part is capable of being glued to the inside of the slot-free band part 10, preferably in the state illustrated in FIG. 3, i.e., in a state where the band is straight or flat. When the band thereafter is wound to a spiral form according to FIG. 6, the strips will also be located in a spiral-shaped configuration, creating a strip set whose outer contour is substantially cylindrically shaped, the strips being substantially evenly distributed in the set. The thus formed strip-carrying insert, that extends across the air flow duct in question and intercepts it, will contain a plurality of inter-spaced pipes or diminutive ducts which are evenly distributed in the body and are designated 12' in FIG. 5. Each such duct is delimited by two interflanges 11, an internal part of the band 10 and parts of the two edge flanges 14 in combination with an externally located part of the spirally wound band 10. The long narrow foil edge part that holds together the strips is squeezed between the inside of the band 10 and the outside of the internally located edge flanges 14 which, as previously mentioned, function as supports or abutments for the foil. This means that the foil does not run the risk of being sucked into the internally located pipe or duct, whereby the requirements on the glue joint between the foil and the band are minimized. It is even feasible to hold the foil between the band 10 and the edge flanges 14 only by a squeezing effect, i.e., without any glue joint.

According to a preferred embodiment of the invention, the band loop, as shown in FIG. 6, may be wound in a spiral form at the same time as adjacent interflanges 11 are axially displaced relative to each other in order to confer to the bands 10, 10', which are spiral-shaped when observed in a cross-section, a helical shape when observed in the axial extension of the insert. In this way, the capability of the insert to silence within different frequency regions is markedly increased. The helical shape of the insert according to FIG. 6 can be realized independently of whether the insert lacks strips or is connected with such strips.

Feasible Modifications of the Invention

The invention is not restricted solely to the embodiments described and shown in the drawings. Thus, it is possible to give to the slotted band unit according to FIG. 3 another shape than specifically the spiral shape as shown in FIG. 4 and 5, in that it is possible to form the band by folding. It is also possible to cut up or cut off the band into straight portions or pieces which are laid parallel to each other side by side, thereby forming a body with a quadrangular or parallel-epipedical contour shape. Furthermore, an electrically insulating layer may be introduced between two adjacent band loops or pieces in the insert body, for instance a condenser paper, whereby the different band loops can be submitted to a voltage with differing electrical currents in the form of continuous current in order to charge the one loop positively and the other one negatively. In this way, the insert can trap negatively as well as positively charged particles from the air. Eventually, it should be pointed out that the pipes or ducts 12 in the insert may advantageously be formed into a pronouncedly elongated shape, as indicated above in the drawings. Thus, the individual duct should have a length that is 12 to 15 times larger than its largest cross-sectional dimension (at a width of, e.g., 3 mm, the length should amount to 36 to 45 mm). By this shape, a nozzle effect is obtained which gives a pressure recovery to the incoming air and a uniform, high frequency motion to the following strips.

I claim:

1. An insert suitable for use in gas ducts, comprising:

a band of resilient material having a plurality of spaced apart first flanges extending outwardly therefrom, each flange of said first flanges having a top edge and a bottom edge, said first flanges being connected at said bottom edge to said band;

said band includes strip elements adapted for motion when in contact with a gas, said motion producing an electrostatically charged field on each of said elements; and a plurality of second flanges, each second flange of said second flanges being spaced apart from each other and connected to a respective first flange at said top edge thereof in spaced relation to said band, said each first flange of said first flanges, said each second flange of said band and said second flanges defining a cavity, each cavity being at least partially open whereby when said band is formed into an insert, a portion of said band is adjacent said second flanges and said cavities are evenly distributed.

2. The insert as defined in claim 1, wherein said band, when wound helically disposes adjacent first flanges in axially spread relation to provide a sound insulating insert.

3. The insert as defined in claim 1, wherein said insert comprises at least two bands, said bands including therebetween an electrostatic insulating layer, whereby said bands when exposed to a voltage of an electric continuous current of different polarity, one band is charged positively and a second band negatively.

4. The insert as defined in claim 1, wherein said band includes strip elements adapted for intermingling motion when exposed to a gas flow, said motion of said elements producing an electrostatically charged field on each of said elements.

5. The insert as defined in claim 4, wherein said insert comprises at least two bands, said bands including therebetween an electrostatic insulating layer, whereby said bands when exposed to a voltage of an electric continuous current of different polarity, one band is charged positively and a second band negatively.

6. The insert as defined in claim 4, wherein said strip elements comprise a polymer material, each strip element of said strip elements having a smooth surface and a dense structure, said elements capable of retaining an electrostatically charged field, whereby accumulations of positively charged or polarized particles from a gas stream, are attracted thereon.

7. The insert as defined in claim 6, wherein said insert comprises at least two bands, said bands including therebetween an electrostatic insulating layer, whereby said bands when exposed to a voltage of an electric continuous current of different polarity, one band is charged positively and a second band negatively.

* * * * *

UNITED STATES PATENT AND TRADEMARK OFFICE
CERTIFICATE OF CORRECTION

PATENT : 5,728,199

DATED : March 17, 1998

INVENTOR(S) : Andreas Von Glehn

It is certified that error appears in the above-identified patent and that said Letters Patent is hereby corrected as shown below:

On the title page, item [22], should read -- June 6, 1995--.

Signed and Sealed this

Twenty-sixth Day of January, 1999

Attest:

Attesting Officer

*Acting Commissioner of Patents and Trademarks*